June 7, 1955     W. W. CUSHMAN     2,710,158
RESILIENT ENGINE MOUNTING
Filed April 18, 1952     2 Sheets-Sheet 1
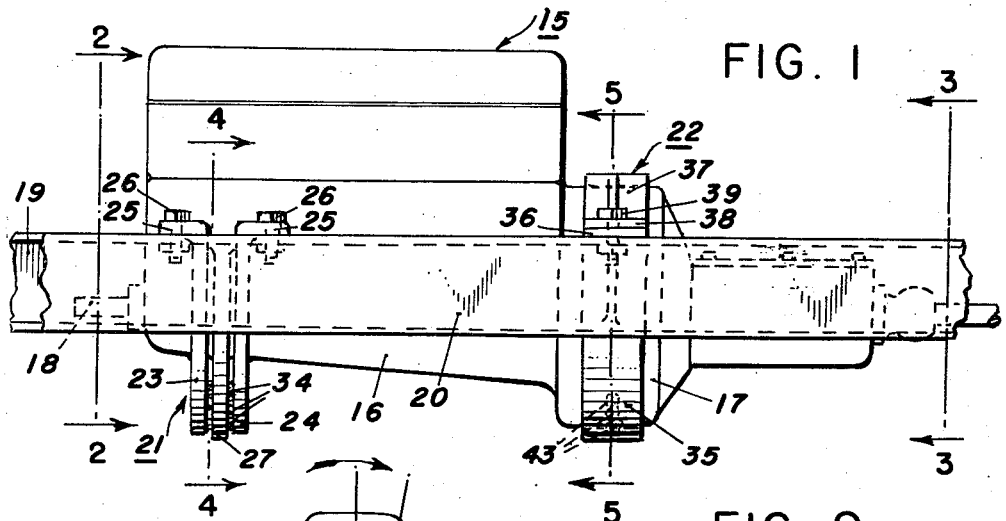
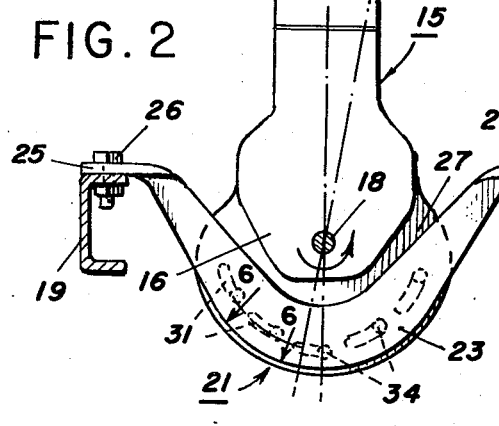
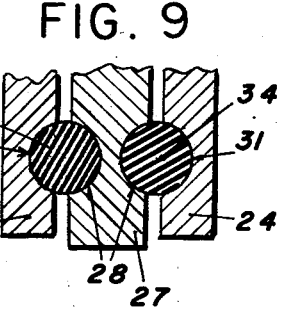
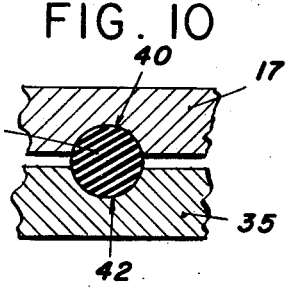
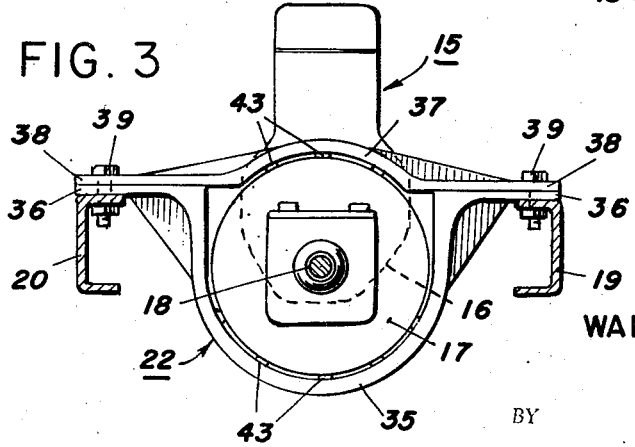
INVENTOR
WALTON W. CUSHMAN,
BY
ATTORNEY June 7, 1955 W. W. CUSHMAN 2,710,158
RESILIENT ENGINE MOUNTING
Filed April 18, 1952 2 Sheets-Sheet 2
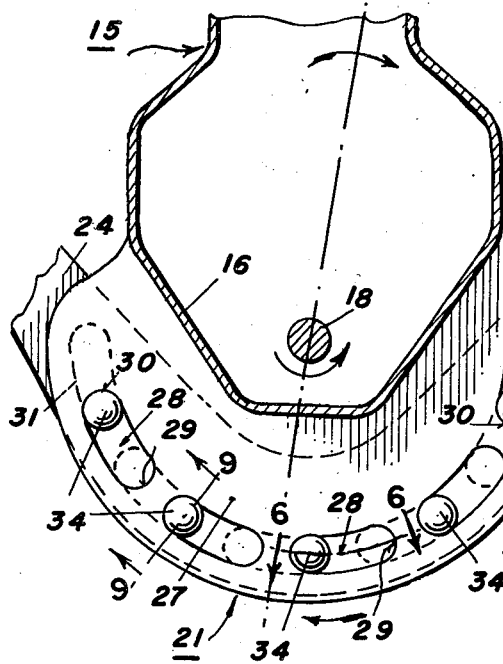
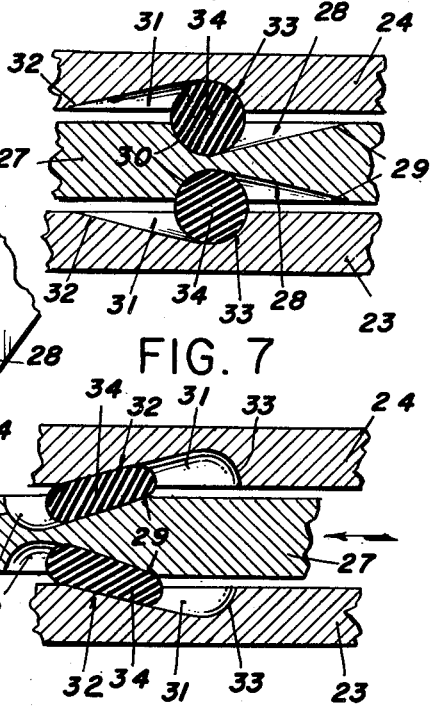
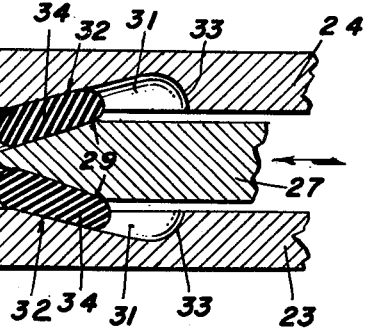
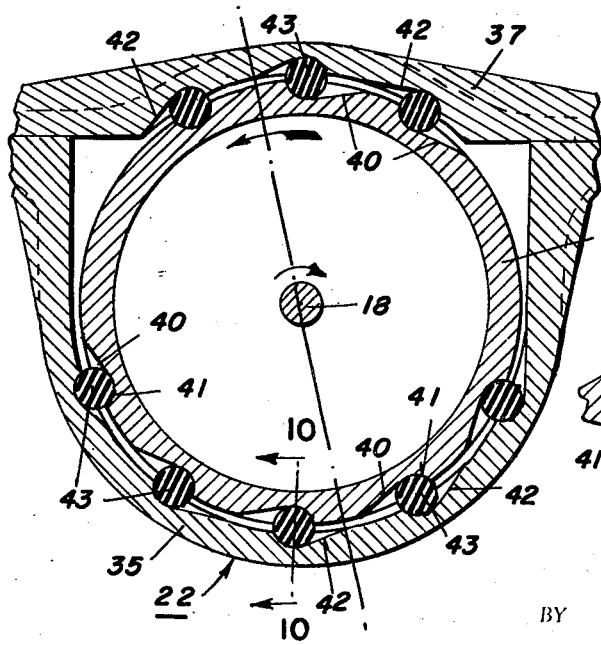
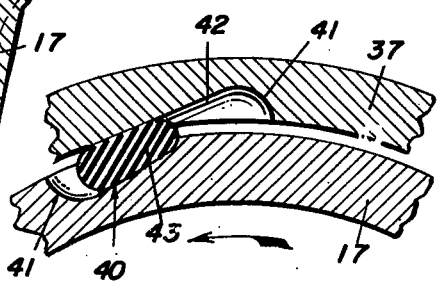
INVENTOR
WALTON W. CUSHMAN,
BY
ATTORNEY

United States Patent Office 2,710,158
Patented June 7, 1955

2,710,158

RESILIENT ENGINE MOUNTING

Walton W. Cushman, Webb City, Mo.

Application April 18, 1952, Serial No. 283,109

5 Claims. (Cl. 248—9)

(Granted under Title 35, U. S. Code (1952), sec. 266)

The invention described herein, if patented, may be manufactured and used by or for the Government for governmental purposes, without the payment to me of any royalty thereon.

My invention relates to a resilient mounting for internal combustion engines or the like.

A primary object of the invention is to provide a resilient mounting for the engines of automotive vehicles, and the like, which will adequately and safely support the engines and enable the same to have limited oscillatory movement about the axis of the crankshaft, in response to the torque produced by the engines.

A further object is to provide a torque responsive resilient engine mounting which is capable of cushioning the engine against both vertical and horizontal forces transmitted to the engine by its connection with the main frame of the vehicle.

A further object is to provide a resilient engine mounting embodying novel means to take advantage of the compressibility of rubber cushioning elements and thereby providing an extremely resilient mounting for the engine.

A further object is to provide a resilient engine mounting which may have its resiliency adjusted in a novel manner to meet the requirements of particular engine mountings.

A still further object of the invention is to provide a resilient engine mounting which is simplified and compact in construction, extremely sturdy and durable, reliable and efficient in operation, and quite inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of an engine mounting embodying my invention, parts broken away, Figure 2 is a transverse vertical section on line 2—2 of Figure 1, Figure 3 is a similar cross section on line 3—3 of Figure 1, Figure 4 is an enlarged fragmentary vertical cross section on line 4—4 of Figure 1, Figure 5 is a similar cross section on line 5—5 of Figure 1, Figure 6 is an enlarged fragmentary cross section on line 6—6 of Figure 4, Figure 7 is a cross section similar to Figure 6 and showing parts of the engine mounting in an extreme adjusted position, Figure 8 is an enlarged fragmentary vertical cross section similar to Figure 5 and showing parts of the engine mounting in one extreme adjusted position, Figure 9 is an enlarged fragmentary radial cross section on line 9—9 of Figure 4, and, Figure 10 is an enlarged fragmentary vertical section on line 10—10 of Figure 5.

In the drawings, where for the purpose of illustration is shown a preferred embodiment of my invention, the numeral 15 designates generally an automobile engine having the usual crankcase 16 and flywheel housing 17, arranged at the rear end of the crankcase 16 and formed integral therewith. The flywheel housing 17 is substantially cylindrical, as shown, and extends somewhat below the bottom of the crankcase 16. The engine 15 has the usual crankshaft 18, and the crankshaft 18 is disposed near the bottom of the crankcase 16 and has a common axis with the cylindrical flywheel housing 17. The numerals 19 and 20 designate the main frame members or sides of the vehicle chassis, and the engine 15 is disposed between the frame sides 19 and 20 and resiliently supported therebetween by my mounting, to be described, with the crankshaft 18 disposed substantially at the same elevation as the frame sides 19 and 20.

My engine mounting preferably comprises forward and rear units 21 and 22, which together constitute a resilient torque responsive mounting for the engine 15, adequately supporting the engine between the frame sides 19 and 20, and allowing the same to have limited oscillatory movement about the axis of the crankshaft 18, in response to the torque developed by the engine.

The forward unit 21 comprises a pair of substantially arcuate underslung rigid plates 23 and 24, which extend under the crankcase 16, near the forward end of the same and upwardly adjacent to the sides of the crankcase as shown clearly in Figures 1 and 2. The plates 23 and 24 may be relatively narrow radially of the crankshaft 18, as shown, and the plates are disposed in vertical parallel relation and are spaced apart longitudinally of the crankcase 16. The plates 23 and 24 are both provided at their opposite ends or tops with integral horizontal extensions or mounting flanges 25, apertured for the reception of bolts 26 which serve to rigidly secure the plates 23 and 24 to the tops of the frame sides 19 and 20, as shown.

An intermediate substantially arcuate web or plate 27 is integrally formed upon the crankcase 16 and extends under the lower side of the same and is disposed in a vertical plane between the vertical plates 23 and 24, and spaced somewhat from the latter. The web or plate 27 is substantially rigid, like the plates 23 and 24, and the several vertical plates are spaced radially below the crankshaft 18 and extend substantially circumferentially for about 180° below the horizontal.

The intermediate and relatively movable plate 27 is provided in its opposite vertical faces with a plurality of equidistantly spaced circumferential grooves 28, the grooves on each side of the plate 27 being preferably about five or six in number, and together extending over a major portion of the circumferential length of the arcuate plate 27. The grooves 28 in one side of the plate 27 are preferably in alignment with the grooves in the other side thereof, Figure 6, and the grooves 28 in both sides of the plate 27 are identical in shape and number. All of the grooves 28 are circularly curved in transverse cross section, as shown in Figure 9, and all are tapered and gradually increase in depth in the same direction. The grooves 28 thus have corresponding shallow or trailing ends 29, where the grooves meet or intersect the opposite vertical faces of the plate 27, and deep leading ends 30 which are substantially hemispherical in cross section. The grooves 28 are all elongated circumferentially of the plate 27, and their lengths and the degree of their taper or inclination may be varied over a considerable range, as desired. Variation of the length and the degree of taper of the grooves 28 is one method of varying the resiliency of my engine mounting, as will be more fully explained hereinafter.

Companion grooves or recesses 31 are formed in the inner vertical faces of the plates 23 and 24 which oppose the opposite sides of the intermediate plate 27. The grooves 31 are identical in shape and number to the grooves 28 in the opposite faces of the plate 27, and the grooves 31 are likewise equidistantly spaced circumferentially of the plates 23 and 24, and spaced radially of the crankshaft 18 the same distance as the grooves 28. However, as best shown in Figures 4 and 6, the grooves 31 are out of phase or staggered circumferentially with respect to the grooves 28 and have their shallow ends 32 and deep ends 33 reversed or oppositely directed circumferentially with respect to the grooves 28. The grooves 28 and 31 are out of phase circumferentially an amount sufficient to cause the deep ends 30 and 33 to be normally oppositely disposed or in alignment for forming a substantially spherical seat or enclosure for resilient deformable balls 34 of rubber, synthetic rubber or the like.

The balls 34 are preferably of uniform diameter and durometer reading so that their resiliency or compressibility will be the same, and the balls are preferably under no substantial degree of compression when disposed within the aligned deep ends 30 and 33 of the grooves 28 and 31, Figure 6. The transverse circular curvature of the grooves 28 and 31 preferably conforms to the spherical curvature of the balls 34 as shown in Figure 9, so that the balls are firmly seated within the companion pairs of grooves 28 and 31 and have no tendency to be displaced laterally from the grooves. If desired, the balls 34 may be prestressed or placed under some degree of compression when disposed within the deep ends 30 and 33, but this is not necessary, and is merely a means of further varying the resiliency of the engine mounting.

The balls 34 are thus arranged in a pair of circumferential groups or rows between the plates 23, 27 and 24, and the balls constitute resilient weight-bearing means for the forward end of the engine 15, and are the only connecting elements between the plates 23, 27 and 24.

When the crankshaft 18 rotates in the direction of the arrow, Figure 2, the torque developed by the engine causes the engine to tend to rotate about the crankshaft in an opposite direction as indicated by the arrow in Figure 2. When this occurs, the intermediate plate 27 which is bodily carried by the engine will move counterclockwise or to the left in Figures 2, 4 and 7. This causes the grooves 28 to shift circumferentially out of alignment with the grooves 31, and the balls 34 undergo a combined rolling and squeezing action within the companion pairs of grooves and gradually assume the flattened and deformed condition shown in Figure 7, when the shallow ends 29 of the grooves 28 move into substantial alignment with the shallow ends 32 of the grooves 31. The engine 15 is thus permitted to turn clockwise for a limited amount in response to the torque developed by the engine. The amount of oscillatory or turning movement of the engine will depend upon several factors, namely the length and slope or degree of inclination of the slots 28 and 31, the relative resiliency of the several rubber balls 34 as determined by their durometer reading, the number of balls employed between the plates 23, 27 and 24, and whether the balls are precompressed when introduced into the companion grooves. Depending upon these variable factors, the engine mounting can be made quite soft or yielding in response to torque, or quite stiff and unyielding, as desired. It should be further pointed out, that if desired the balls 34 and the slots receiving them may be arranged in multiple circumferential rows, instead of the single row arrangement shown in the drawings, and this will of course render the engine mounting capable of supporting a greater weight and also alter the relative resiliency of the same.

The balls 34 are subjected to a sheering stress, due to the vertical force exerted by the engine 15, but the depth of the slots 28 and 31 is such, together with the other factors that there is no liability of the balls 34 being displaced laterally from the slots. Due to the vertical disposition of the plates 23, 27 and 24, with the resilient balls 34 between them, the forward unit 21 of my engine mounting is well adapted to absorb longitudinal or horizontal forces such as those caused by sudden starting and stopping of the automobile, but the forward unit 21 is also capable of supporting the forward end of the engine against necessary vertical shocks induced when the car passes over bumps or irregularities in the roadway, or the like.

The extent or degree of rotation of the engine 15 about the crankshaft 18 and the corresponding extent of movement of the plate 27 relative to the stationary plates 23 and 24 will of course depend upon the amount of torque produced by the engine, and this in turn is dependent upon speed and other variables. When the engine is idle, the balls 34 will assume their positions shown in Figures 4 and 6, and the engine 15 will be vertical as shown in Figure 2 and no torque is now being developed. Whenever the engine 15 is operating, depending upon how much torque is being developed, the plate 27 will assume some adjusted position relative to the fixed plates 23 and 24, and the balls 34 will be subjected to some degree of distortion as they roll and are squeezed within the companion grooves 28 and 31. The condition shown in Figure 7 illustrates the maximum distortion or compression of the balls 34, when the engine is developing maximum torque, and the engine now rotates about the crankshaft on its resilient mounting to the maximum possible extent. The resiliency of the several balls 34 causes the engine to return toward its normal vertical position of Figure 2, whenever the torque developed by the engine is decreased or reduced to zero. The unit 21 thus affords a torque responsive resilient mounting of high flexibility which will adequately support the weight of the engine and brace the same against end thrust or horizontal movement, while permitting the engine to oscillate about the crankshaft in response to variations in torque developed by the engine. A maximum dampening of vibrations produced by the engine and normally transmitted through the main frame to the automobile is thus afforded by the unit 21, and the degree of resiliency or torque responsiveness of the unit is readily adjustable by the various means previously mentioned. The arrangement of the unit 21 is highly compact, simplified, and extremely sturdy in construction. The weight of the engine is borne by the frame sides 19 and 20 and transmitted thereto through the sturdy plates 23 and 24, the several resilient balls 34 actually carrying the load and cushioning the engine.

I also provide in my engine mounting a rear unit 22, as previously stated, and this rear unit supplements the action of the forward unit 21 in adequately supporting the engine and providing a smooth acting torque responsive resilient mounting for the same.

The rear unit 22 comprises a substantially U-shaped underslung strap or holder 35 which extends about and is concentric with the lower half of the flywheel housing 17, Figure 5. The strap 35 is spaced radially a slight distance from the periphery of the flywheel housing 17 and has its sides extending vertically upwardly and terminating near and slightly below the top of the flywheel housing 17 and adjacent to the tops of the frame sides 19 and 20, Figures 3 and 5. Flat horizontal outwardly directed extensions or plates 36 are integrally secured to the sides of the U-shaped strap 35, and these extensions rest upon the tops of the frame sides 19 and 20. A bearing cap or retainer 37 extends over the top of the flywheel housing 17, and is circularly curved to conform to the cylindrical shape of the housing 17, and spaced radially therefrom a slight distance. The cap 37 has flat horizontal integral arms or plate extensions 38 which overlie the extensions 36 and rest upon the same. The extensions 36 and 38 are apertured for the reception of bolts 39, serving to rigidly secure the rear unit 22 to the frame sides 19 and 20, Figure 3. It is thus seen that the U-shaped strap 35 and bearing cap 37 form a substantially cylindrical enclosure or band about the cylindrical flywheel housing 17, and stationary in relation thereto because of the bolts 39.

The flywheel housing 17 is provided in its periphery and along its top and bottom sides with circumferentially equidistantly spaced grooves or recesses 40, preferably identical in shape with the previously described grooves 28 and 31, but arranged in a peripheral plane with respect to the flywheel housing 17, rather than in a vertical plane like the grooves 28 and 31. Preferably about five of the grooves 40 are formed in the bottom of the flywheel housing 17, and about three in the top thereof as shown in Figure 5, and the grooves 40 have their deep leading ends 41 facing in the same direction as the leading ends 30 of the grooves 28, so that the rear unit 22 will work with and supplement the action of the forward unit 21 and not work against the same. The deep ends 41 are substantially hemispherical in shape, and the slope or inclination of the grooves 40 toward their shallow trailing ends is preferably the same as the slope or inclination of the grooves 28.

Companion grooves or recesses 42 are formed within the inner surfaces of the band 35 and bearing cap 37, as shown, and the grooves 42 are offset or staggered circumferentially with respect to the grooves 40 in the same manner that the grooves 31 are staggered with respect to the grooves 28. Likewise, the grooves 42 have their shallow ends extending circumferentially in the opposite direction from the shallow ends of the grooves 40, Figure 5, and the grooves 42 are identical in number and shape with the grooves 40. The opposite deep ends of the grooves 40 and 42 receive resilient deformable balls 43, preferably identical with the balls 34 and adapted to coact with the tapered grooves 40 and 42 in the identical manner that the balls 34 coact with the grooves 28 and 31 to provide the torque responsive resilient mounting for the engine 15.

In the rear unit 22, the balls 43 are essentially subject to compressive stress due to the vertical load produced by the engine, whereas the balls 34 in the forward unit 21 are subject to a sheering stress due to the vertical load of the engine. The rear unit 22 is thus adapted to absorb shocks in the vertical direction, either upwardly or downwardly, caused by the vehicle passing over bumps in the road or the like. The three balls 43 at the top of the flywheel housing 17 resist upward movement of the engine 15, while the five balls at the bottom of the flywheel housing carry the downward load of the engine. Both of the units 21 and 22 function in the same manner and work together in providing the torque responsive resilient mounting for the engine, and allowing the engine to partake of limited rotational movement about the crankshaft 18, as previously described in detail in connection with the forward unit 21.

A reference to Figure 8 of the drawings illustrates the coaction of the balls 43 with the slots 40 and 42, when the flywheel housing 17 rotates in response to the torque developed by the engine 15, the balls 43 being shown in their maximum compressed condition, after the shallow trailing ends of the slots 40 have moved substantially into radial alignment with the shallow ends of the slots 42. The resiliency of the several balls 43 and 34 causes the engine 15 to return to the normal upright position of Figure 2 when the engine is idle.

Like the forward unit 21, the rear unit 22 is adjustable to vary the degree of resiliency in the torque responsive mounting, by varying the slope and length of the slots 40 and 42, varying the durometer reading and number of the balls 43, varying the number of circumferential rows of balls 43 as desired, and pre-compressing the balls when introducing the same into the grooves 40 and 42. The rear unit 22 is likewise highly compact in construction, simplified and extremely sturdy and durable. The bearing cap 37 and underslung band 35 project a slight distance only beyond the flywheel housing 17, and the entire weight of the rear end of the engine is carried by the frame sides 19 and 20 through the sturdy extensions 36 and 38, and associated elements.

While I have shown and described my resilient engine mounting as comprising the forward and rear units 21 and 22, which together make up an ideal mounting to resist forces in both the vertical and horizontal direction, I wish to point out that I also contemplate using the units 21 and 22 separately and alone as resilient torque responsive mountings for engines and the like. When either of the units 21 or 22 is employed alone, any other desired type of support may be provided for the opposite end of the engine 15, and the particular unit 21 or 22 will still function in the desired manner previously described. Where the unit 21 is used alone, it may be preferable to position the same substantially at the center of gravity of the engine 15, rather than at the forward end of the engine, as shown.

In any event, my torque responsive resilient engine mounting affords safe and adequate means for supporting the engine 15 and cushioning the same against shocks and vibrations from the road, while allowing the same to turn or oscillate through a considerable angle, in response to the reaction of torque developed by the engine. Particular attention is directed to the novel coaction between the rubber balls 34 and 43 and the slots or grooves which contain them. The balls are subject to a combined rolling and squeezing action as the engine oscillates, and the balls return automatically to their normal undistorted spherical conditions at the deep ends of the grooves when the engine is developing no torque. The arrangement affords a highly flexible or resilient engine mounting and at the same time the engine is firmly and securely connected with the main frame including the sides 19 and 20 and entirely suspended in rubber or equivalent material from which the balls 34 and 43 are made.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A resilient mounting for an engine or the like comprising support means, a first member dependingly secured to the engine and extending about the lower side only thereof, the first member having a plurality of spaced recesses in one face thereof arranged in an arcuate row, the arcuate row of recesses extending throughout a major portion of the length of said first member, the recesses of the row increasing in depth toward corresponding ends so that the recesses have deep and shallow ends, a second member dependingly secured to said supporting means in opposition to the first member and extending about the lower side only of the engine, the second member having a plurality of spaced recesses in one face thereof arranged in an arcuate row substantially coextensive with the row of recesses in the first member, the recesses in the second member increasing in depth toward corresponding ends so that the recesses of the second member have deep and shallow ends, the recesses of the second member increasing in depth in the opposite direction in their arcuate row from the recesses of the first member, the recesses of the second member being staggered relative to the recesses in the first member so that their deep ends are normally in alignment with the deep ends of the recesses in the first member, and a plurality of balls of resilient material arranged within the normally aligned deep ends of the recesses of the first and second members and substantially uncompressed and adapted to roll toward the shallow ends of the recesses of the first and second members and be compressed therein when the engine rocks about the axis of its crankshaft in one direction responsive to torque developed by the engine.

2. A resilient mounting for an engine or the like comprising supporting means, a first member dependingly secured to the engine and extending about its lower side, the first member having a plurality of spaced recesses in its opposite faces arranged in arcuate rows about the lower side of the engine, the recesses of the rows increasing in depth toward corresponding ends so that the recesses have shallow and deep ends, members dependingly secured to said supporting means on opposite sides of the first member and extending about the lower side of the engine, said members being provided in their faces adjacent to the opposite sides of the first member with a plurality of spaced recesses arranged in arcuate rows about the lower side of the engine substantially coextensive with the arcuate rows of recesses in the first member, the recesses in said members increasing in depth toward corresponding ends so that the recesses of said members have shallow and deep ends, the recesses of said members increasing in depth in the opposite direction in their rows from the recesses of the first member, the recesses of said members being staggered relative to the recesses in the first member so that their deep ends are normally aligned with the deep ends of the recesses in said first member, and a plurality of balls of resilient material arranged within the normally aligned deep ends of the recesses of the first member and said members and substantially uncompressed and adapted to roll toward the shallow ends of the recesses of the first member and said members and be compressed therein when the engine rocks about the axis of its crankshaft in one direction responsive to torque developed by the engine.

3. A resilient mounting for an engine comprising supporting means, an intermediate substantially vertical plate dependingly secured to the engine and extending about the lower side of the engine, the intermediate plate being provided in its opposite faces with spaced recesses arranged in arcuate rows extending about the lower side of the engine, the recesses of the rows increasing in depth toward corresponding ends so that the recesses have deep and shallow ends, substantially vertical end plates dependingly secured to said supporting means on opposite sides of the intermediate plate and spaced from the intermediate plate and extending about the lower side of the engine, the end plates being provided in their faces adjacent to the opposite faces of the intermediate plate with spaced recesses arranged in arcuate rows which are substantially coextensive with the arcuate rows of recesses in the intermediate plate, the recesses in the end plates increasing in depth toward corresponding ends so that they have shallow and deep ends, the recesses of the end plates increasing in depth in the opposite direction in their rows from the recesses of the intermediate plate, the recesses of the end plates being staggered with respect to the recesses of the intermediate plate so that their deep ends are normally aligned with the deep ends of the recesses in the intermediate plate, and a plurality of balls of resilient material arranged within the normally aligned deep ends of the recesses of the intermediate and end plates and substantially uncompressed and adapted to roll toward the shallow ends of the recesses of the intermediate and end plates and be compressed therein when the engine turns upon the axis of its crankshaft in one direction responsive to torque developed by the engine.

4. A resilient mounting for an engine or the like comprising supporting means, a substantially arcuate member secured to the engine and extending about its lower side only and having a peripheral face, said peripheral face having a plurality of spaced recesses therein and arranged in an arcuate row, the arcuate row of recesses extending throughout a major portion of the length of the arcuate member, the recesses of the row increasing in depth toward corresponding ends whereby the recesses have deep and shallow ends, a substantially arcuate band dependingly secured to the supporting means and extending about said peripheral face of the arcuate member and being substantially concentric therewith, said band having a plurality of spaced recesses in its inner face and arranged in an arcuate row substantially coextensive with the row of recesses in the arcuate member, the recesses of the band increasing in depth toward corresponding ends whereby such recesses have deep and shallow ends, the recesses of the band increasing in depth in the opposite direction in their row to the recesses of the arcuate member, the recesses of the band being staggered relative to the recesses of the arcuate member whereby their deep ends are normally in alignment with the deep ends of the recesses of the arcuate member, and a plurality of balls of resilient material arranged within the normally aligned deep ends of the recesses of the arcuate member and band and substantially uncompressed and adapted to roll toward the shallow ends of the recesses of the arcuate member and band and being compressed therein when the engine rocks about the axis of its crankshaft in one direction in response to torque developed by the engine.

5. A resilient mounting for an engine or the like comprising supporting means, a substantially cylindrical member secured to the engine and having a peripheral face provided with a plurality of circumferentially spaced recesses, said recesses being arranged in a row circumferentially of the cylindrical member with certain of the recesses disposed near the top of said member and others near the bottom of the member, the recesses of the row increasing in depth toward corresponding ends whereby the recesses have deep and shallow ends, an arcuate band dependingly secured to said supporting means and extending about the lower portion of the peripheral face of said cylindrical member, said band having a plurality of spaced recesses in its inner face and arranged in a row substantially coextensive with the row of recesses in the lower side of said member, an arcuate cap extending about the top portion of the peripheral face of the cylindrical member and secured to the supporting means and provided in its lower face with spaced recesses and arranged in a row substantially coextensive with the row of recesses in the upper portion of said member, the recesses of said band and cap increasing in depth toward corresponding ends and in the opposite direction to the recesses of the cylindrical member circumferentially of the member, the recesses of the band and cap having deep and shallow ends, the recesses of the band and cap being staggered relative to the recesses of said cylindrical member whereby their deep ends are normally in alignment with the deep ends of the recesses of the member, and a plurality of balls of resilient material arranged within the normally aligned deep ends of the recesses of the cylindrical member, band and cap and substantially uncompressed and adapted to roll toward the shallow ends of the recesses of the cylindrical member, band and cap and to be compressed therein when the engine rocks about the axis of its crankshaft in one direction in response to torque developed by the engine.

References Cited in the file of this patent

UNITED STATES PATENTS

| 1,959,969 | Saurer | May 22, 1934 |
| 2,044,714 | Trott | June 16, 1936 |
| 2,056,237 | Trott | Oct. 6, 1936 |
| 2,056,873 | Trott | Oct. 6, 1936 |
| 2,171,774 | Wendes | Sept. 5, 1939 |
| 2,308,311 | Saurer | Jan. 12, 1943 |

FOREIGN PATENTS

| 785,899 | France | May 27, 1935 |
| 818,075 | France | June 7, 1937 |
| 957,495 | France | Aug. 22, 1949 |
| 995,288 | France | Aug. 14, 1951 |